(12) United States Patent
Wang et al.

(10) Patent No.: US 8,949,944 B2
(45) Date of Patent: Feb. 3, 2015

(54) METHOD AND SYSTEM FOR MULTI-ACCESS AUTHENTICATION IN NEXT GENERATION NETWORK

(75) Inventors: Hongyan Wang, Shenzhen (CN); Yinxing Wei, Shenzhen (CN); Yifeng Bi, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 9 days.

(21) Appl. No.: 13/641,018

(22) PCT Filed: Nov. 18, 2010

(86) PCT No.: PCT/CN2010/078896
§ 371 (c)(1),
(2), (4) Date: Nov. 7, 2012

(87) PCT Pub. No.: WO2011/127732
PCT Pub. Date: Oct. 20, 2011

(65) Prior Publication Data
US 2013/0047220 A1    Feb. 21, 2013

(30) Foreign Application Priority Data
Apr. 13, 2010    (CN) .......................... 2010 1 0146342

(51) Int. Cl.
*H04L 29/06* (2006.01)
*H04W 12/06* (2009.01)
*H04L 9/32* (2006.01)
*H04L 9/08* (2006.01)

(52) U.S. Cl.
CPC ........... *H04W 12/06* (2013.01); *H04L 63/0815* (2013.01); *H04L 9/321* (2013.01); *H04L 9/3271* (2013.01); *H04L 63/061* (2013.01); *H04L 9/0816* (2013.01)
USPC ............................................. 726/4; 713/182

(58) Field of Classification Search
CPC ... H04L 63/0892; H04L 9/321; H04L 63/061; H04L 9/0816
USPC .............................................................. 726/4
See application file for complete search history.

(56) References Cited

U.S. PATENT DOCUMENTS 7,450,554 B2 * 11/2008 Zhang ........................... 370/338
8,769,620 B2 *  7/2014 Li et al. ............................ 726/4

(Continued)

FOREIGN PATENT DOCUMENTS

CN    1668005 A    9/2005
CN    1984436 A    6/2007

(Continued)

OTHER PUBLICATIONS

International Search Report in international application No. PCT/CN2010/078896, mailed on Feb. 24, 2011.

(Continued)

*Primary Examiner* — Harunur Rashid
*Assistant Examiner* — Bryan Wright
(74) *Attorney, Agent, or Firm* — Oppedahl Patent Law Firm LLC

(57) ABSTRACT

It is provided a method and system for multi-access authentication in Next Generation Network (NGN). A network side authentication center (NSAC) generates an authentication vector after receiving, from a user terminal (UT), UT information including subscription information and multi-access information of the UT; after receiving an authentication request including authentication information from the NSAC, the UT performs authentication on the network side, generates keying material and network side authentication information (NSAI) upon successful authentication, and sends the NSAI to the NSAC, which performs authentication on the NSAI using the authentication vector, generates keying material according to the multi-access information of the UT upon successful authentication, and informs an access forwarding functional module (AFFM) of the keying material; the AFFM encrypts and decrypts access service information of the UT according to the keying material. The efficiency with which the UT accesses the network is enhanced.

6 Claims, 8 Drawing Sheets

(56) References Cited

U.S. PATENT DOCUMENTS

| | | | |
|---|---|---|---|
| 2006/0174117 A1* | 8/2006 | Laitinen | 713/169 |
| 2006/0242414 A1 | 10/2006 | Corson et al. | |
| 2009/0061820 A1* | 3/2009 | Patel et al. | 455/411 |
| 2011/0072512 A1* | 3/2011 | Je et al. | 726/21 |
| 2012/0011574 A1* | 1/2012 | Holtmanns et al. | 726/4 |

FOREIGN PATENT DOCUMENTS

| | | |
|---|---|---|
| CN | 101127652 A | 2/2008 |
| CN | 101299888 A | 11/2008 |
| CN | 101483521 A | 7/2009 |
| CN | 101610507 A | 12/2009 |
| CN | 101610527 A | 12/2009 |
| EP | 1852999 A1 | 11/2007 |
| TW | 200642350 A | 12/2006 |

OTHER PUBLICATIONS

English Translation of the Written Opinion of the International Search Authority in international application No. PCT/CN2010/078896, mailed on Feb. 24, 2011.

* cited by examiner

METHOD AND SYSTEM FOR MULTI-ACCESS AUTHENTICATION IN NEXT GENERATION NETWORK

TECHNICAL FIELD

The disclosure relates to authentication techniques, in particular to a method and system for multi-access authentication in Next Generation Network (NGN).

BACKGROUND

NGN as an evolved network framework based on packet switching has attracted more and more attention. Telecommunication Standardization Sector of the International Telecommunications Union (ITU-T) and other regional standardization organizations such as the European Telecommunications Standards Institute (ETSI), the Alliance for Telecommunications Industry Solution (ATIS), and the like carry out general studies and standardization on the NGN framework model, service and relevant areas.

NGN is capable of supporting multi-access of a network. When a mobile user terminal performs multi-access, it is required to ensure service continuity, as well as to reduce authentication signaling between the mobile user terminal and an NGN network. There are 5 scenarios of multi-access defined in the NGN network.

Wherein there is a scenario, in which a user has multiple access modules that access a same access node, so as to achieve higher speed, offer faster data transmission and optimized experience, and enhance utilization rate of radio resources. When the user accesses the same nodes simultaneously, it is required to protect privacy and integrity of data between different access modules and the network access node, and in order to avoid interferences different access modules, different access modules of the terminal should use different keys. The terminal may generate different keys through performing authentication respectively between the NGN network and different access modules.

This however increases signaling interactions between the user terminal and the NGN network, which doubtlessly hinders the speed with which the user terminal accesses the network, resulting in vast waste of air interface resources which are already in shortage.

SUMMARY

In view of the above problem, the disclosure aims to provide a method and system for multi-access authentication in NGN, keying material for multi-access information of a user terminal is generated during authentication performed between the user terminal and the network side authentication center, so as to achieve key protection for each access service.

To achieve the above objective, the technical solution of the disclosure is implemented as follows.

The disclosure provides a method for multi-access authentication in Next Generation Network (NGN), wherein a network side authentication center and an access node are provided at a network side, and the access node includes an access forwarding functional module and an access managing functional module; the method includes:

generating, by the network side authentication center, an authentication vector after receiving user terminal information from a user terminal; wherein the user terminal information includes subscription information and multi-access information of the user terminal;

performing, by the user terminal, authentication on the network side after receiving an authentication request from the network side authentication center, and generating keying material and network side authentication information according to the multi-access information of the user terminal itself upon successful authentication, and sending the network side authentication information to the network side authentication center; wherein the authentication request includes authentication information;

performing, by the network side authentication center, authentication on the network side authentication information using the authentication vector; and generating keying material according to the multi-access information of the user terminal upon successful authentication.

Preferably, the method may further include:

acquiring, by the access forwarding functional module, the keying material from the network side authentication center or the access managing functional module, and encrypting and decrypting access service information of the user terminal using the keying material.

Preferably, generating keying material according to the multi-access information of the user terminal itself may include:

generating, by the user terminal, keying material for each access interface according to the multi-access information of the user terminal itself;

generating keying material according to the multi-access information of the user terminal upon successful authentication may include:

generating, by the network side authentication center, keying material for each access interface according to the multi-access information of the user terminal; and acquiring, by the access forwarding functional module, the keying material from the network side authentication center may include:

sending, by the network side authentication center, the keying material directly to the access forwarding functional module, or sending the keying material to the access forwarding functional module via the access managing functional module.

Preferably, generating keying material according to the multi-access information of the user terminal itself may include:

generating, by the user terminal, a master key, and generating keying material for each access interface according to the multi-access information of the user terminal itself;

generating keying material according to the multi-access information of the user terminal upon successful authentication may include:

generating, by the network side authentication center, a master key, and generating keying material for each access interface according to the multi-access information of the user terminal; and acquiring, by the access forwarding functional module, the keying material from the network side authentication center may include:

sending, by the network side authentication center, the generated keying material directly to the access forwarding functional module, or sending the generated keying material to the access forwarding functional module via the access managing functional module.

Preferably, generating keying material according to the multi-access information of the user terminal itself may include:

generating, by the user terminal, a master key, and generating keying material for each access interface according to the multi-access information of the user terminal itself;

generating keying material according to the multi-access information of the user terminal upon successful authentication may include:

generating, by the network side authentication center, keying material for each access interface according to the multi-access information of the user terminal; and acquiring, by the access forwarding functional module, the keying material from the network side authentication center may include:

sending, by the network side authentication center, the generated keying material directly to the access forwarding functional module, or sending the generated keying material to the access forwarding functional module via the access managing functional module.

Preferably, generating keying material according to the multi-access information of the user terminal itself may include:

generating, by the user terminal, keying material for each access interface according to the multi-access information of the user terminal itself;

generating keying material according to the multi-access information of the user terminal upon successful authentication may include:

generating, by the network side authentication center, a master key, and generating keying material for each access interface according to the multi-access information of the user terminal; and acquiring, by the access forwarding functional module, the keying material from the network side authentication center may include:

sending, by the network side authentication center, the generated keying material directly to the access forwarding functional module, or sending the generated keying material to the access forwarding functional module via the access managing functional module.

Preferably, generating keying material according to the multi-access information of the user terminal itself may include:

generating, by the user terminal, keying material for each access interface according to the multi-access information of the user terminal itself;

generating keying material according to the multi-access information of the user terminal upon successful authentication may include:

generating, by the network side authentication center, a master key, and informing the access managing functional module of the master key; generating, by the access managing functional module, keying material for each access interface according to the master key and the multi-access information of the user terminal, wherein the access managing functional module acquires the multi-access information of the user terminal from the user terminal or the network side authentication center; and acquiring, by the access forwarding functional module, the keying material from the access managing functional module may include:

sending, by the access managing functional module, the generated keying material to the access forwarding functional module.

Preferably, generating keying material according to the multi-access information of the user terminal itself may include:

generating, by the user terminal, a master key, and generating keying material for each access interface according to the multi-access information of the user terminal itself;

acquiring, by the access forwarding functional module, the keying material from the network side authentication center may include:

generating, by the network side authentication center, a master key, and informing the access managing functional module of the master key; generating, by the access managing functional module, keying material for each access interface according to the master key and the multi-access information of the user terminal, wherein the access managing functional module acquires the multi-access information of the user terminal from the user terminal or the network side authentication center; and acquiring, by the access forwarding functional module, the keying material from the access managing functional module may include:

sending, by the access managing functional module, the generated keying material to the access forwarding functional module.

The disclosure also provides a system for multi-access authentication in Next Generation Network (NGN), the system includes a network side and a user terminal, wherein the network side is provided with a network side authentication center and an access node, and the access node includes an access forwarding functional module and an access managing functional module; the system further comprising: a first receiving unit, a first generating unit, a second receiving unit, a first authenticating unit, a second generating unit, a sending unit, a second authenticating unit, and a third generating unit, wherein the second receiving unit, the first authenticating unit, the second generating unit, and the sending unit are arranged in the user terminal, and the first receiving unit, the first generating unit, the second authenticating unit, and the third generating unit are arranged in the network side authentication center; wherein the first receiving unit is configured to receive user terminal information from the user terminal; wherein the user terminal information includes subscription information and multi-access information of the user terminal;

the first generating unit is configured to generate an authentication vector after the first receiving unit receives the user terminal information;

the second receiving unit is configured to receive an authentication request from the network side authentication center;

the first authenticating unit is configured to perform authentication on the network side;

the second generating unit is configured to generate keying material and network side authentication information according to the multi-access information of the user terminal upon successful authentication by the first authenticating unit;

the sending unit is configured to send the network side authentication information to the network side authentication center; wherein the authentication request includes authentication information;

the second authenticating unit is configured to perform authentication on the network side authentication information using the authentication vector; and the third generating unit is configured to generate keying material according to the multi-access information of the user terminal upon successful authentication by the second authenticating unit.

Preferably, the access forwarding functional module may be configured to acquire the keying material from the network side authentication center or the access managing functional module; and encrypt and decrypt access service information of the user terminal using the keying material.

Preferably, the second generating unit may be further configured to generate keying material for each access interface according to the multi-access information of the user terminal;

the third generating unit may be further configured to generate keying material for each access interface according to the multi-access information of the user terminal; and acquiring, by the access forwarding functional module, the keying material from the network side authentication center may include:

the third generating unit sends the generated keying material directly to the access forwarding functional module, or sends the generated keying material to the access forwarding functional module via the access managing functional module.

Preferably, the second generating unit may be further configured to generate a master key, and generate keying material for each access interface according to the multi-access information of the user terminal;

the third generating unit may be further configured to generate a master key, and generate keying material for each access interface according to the multi-access information of the user terminal; and acquiring, by the access forwarding functional module, the keying material from the network side authentication center may include: the third generating unit sends the generated keying material directly to the access forwarding functional module, or sends the generated keying material to the access forwarding functional module via the access managing functional module.

Preferably, the second generating unit may be further configured to generate a master key, and generate keying material for each access interface according to the multi-access information of the user terminal;

the third generating unit may be further configured to generate keying material for each access interface according to the multi-access information of the user terminal; and acquiring, by the access forwarding functional module, the keying material from the network side authentication center may include: the third generating unit sends the generated keying material directly to the access forwarding functional module, or sends the generated keying material to the access forwarding functional module via the access managing functional module.

Preferably, the second generating unit may be further configured to generate keying material for each access interface according to the multi-access information of the user terminal;

the third generating unit may be further configured to generate a master key, and generates keying material for each access interface according to the multi-access information of the user terminal; and acquiring, by the access forwarding functional module, the keying material from the network side authentication center may include: the third generating unit sends the generated keying material directly to the access forwarding functional module, or sends the generated keying material to the access forwarding functional module via the access managing functional module.

Preferably, the second generating unit may be further configured to generate keying material for each access interface according to the multi-access information of the user terminal;

the third generating unit may be further configured to generate a master key, and send the master key to the access managing functional module; the access managing functional module is configured to generate keying material for each access interface according to the master key and the multi-access information of the user terminal, wherein the access managing functional module acquires the multi-access information of the user terminal from the user terminal or the network side authentication center; and acquiring, by the access forwarding functional module, the keying material from the access managing functional module may include:

the access managing functional module sends the generated keying material to the access forwarding functional module.

Preferably, the second generating unit may be further configured to generate a master key, and generate keying material for each access interface according to the multi-access information of the user terminal;

the third generating unit may be further configured to generate a master key, and sends the master key to the access managing functional module;

the access managing functional module may be configured to generate keying material for each access interface according to the master key and the multi-access information of the user terminal, wherein the access managing functional module acquires the multi-access information of the user terminal from the user terminal or the network side authentication center; and acquiring, by the access forwarding functional module, the keying material from the access managing functional module may include:

the access managing functional module sends the generated keying material to the access forwarding functional module.

In the present disclosure, when the user terminal accesses the NGN network and authentication is performed between the user terminal and the authentication server in the NGN network, the user terminal informs the authentication server of the multi-access information supported by the user terminal itself, the authentication server and the user terminal generate keying material for the multi-access information by the same key generation way, the user terminal uses the corresponding keying material to encrypt and decrypt the service information when carrying out a corresponding service with the network side, so that protection over multi-access information is achieved between the network side and the user terminal. In the disclosure, when accessing the network for the first time, the user terminal achieves during authentication, generation of keying material for multi-access information of the user terminal, without needing to perform individual authentication on each access service and generate corresponding keying material, thus saving precious air interface resources and enhancing efficiency with which the user terminal accesses the network.

DETAILED DESCRIPTION

The basic concept of the disclosure is that: when the user terminal accesses the NGN network and authentication is performed between the user terminal and the authentication server in the NGN network, the user terminal informs the authentication server of the multi-access information supported by the user terminal itself, the authentication server and the user terminal generate keying material for the multi-access information by the same key generation way, the user terminal uses the corresponding keying material to encrypt and decrypt the service information when carrying out a corresponding service with the network side, so that protection over multi-access information is achieved between the network side and the user terminal.

To make the objective, technical solution and advantage of the present disclosure clearer, the present disclosure is further elaborated below with embodiments in combination with drawings.

In the disclosure, an NGN network includes a network side and a user terminal, wherein the network side is provided with a network side authentication center, a user data center, an access node, and the like, the network side authentication center includes network elements with authentication function, such as an authentication server, the user information center is configured to store data such as subscription information of the user terminal, for example, network elements such as Home Subscriber Server (HSS) or Home Location Register (HLR) at the network side; the access node includes network elements such as a base station (BS) and/or a BS controller, and the access node includes basic functional modules such as an access forwarding functional module and an access managing functional module, wherein the access forwarding functional module is configured to forward an access service, and the access managing functional module is configured to manage the access service correspondingly. As the above network elements are all existing network elements, and their functions are essentially the same as that of the existing network elements, their specific structure and function are not hereby repeated. The essence of the technical solution of the present disclosure is further illustrated below with reference to the drawings.

Figure 1:
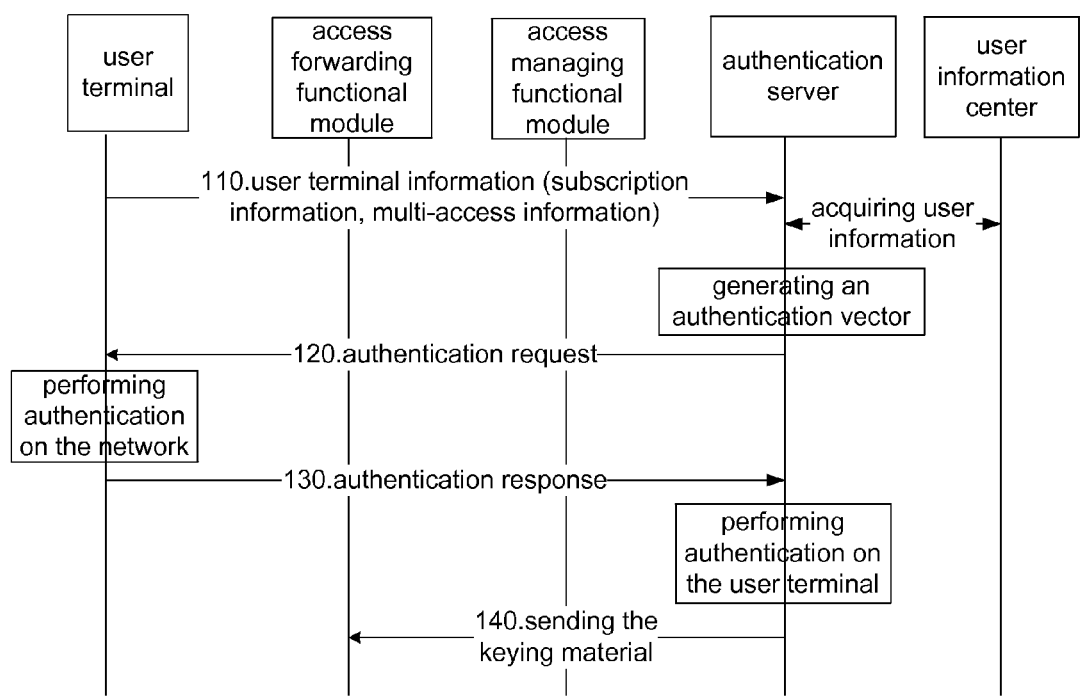
FIG. 1 is a flowchart of Embodiment 1 of a method for multi-access authentication in NGN according to the present disclosure.

FIG. 1 is a flowchart of Embodiment 1 of the method for multi-access authentication in NGN according to the present disclosure. As shown in FIG. 1, the method for multi-access authentication in NGN in this embodiment includes the following steps.

Step 110: when accessing the network, the user terminal sends via the access node to the authentication server a relevant message of the user terminal itself, wherein the message sent by the user terminal to the authentication server at least includes subscription information of the user terminal and multi-access information of the multi-access service supported by the user terminal, wherein the multi-access information includes the identifier of the multi-access service, information of multiple interfaces of the user terminal, and the like. The authentication server generates a corresponding authentication vector after receiving the relevant message sent by the user terminal. Here, the authentication vector may be locally generated directly at the authentication server, specifically, the authentication vector may be obtained by direct calculation using a preset relevant algorithm of the authentication vector according to user subscription information reported by the user terminal and the like. Here, basic information involved in calculating the authentication vector includes various subscription information of the user, identifier information of the user terminal, and the like. The authentication vector may also be generated after interaction with the user information center and acquisition of the subscription information of the user terminal.

Step 120: the authentication server sends to the user terminal an authentication request including authentication information such as a challenge value.

An authentication process of the user terminal is achieved after the relevant information of the user terminal is received. This authentication process will be the process of mutual authentication of both the network side and the authentication server. Specifically, the authentication server first initiates an authentication request to the user terminal to achieve authentication on the user terminal.

Step 130: after receiving the authentication request, the user terminal performs authentication on the network side according to authentication information in the authentication request, and generates keying material and network side authentication information according to the multi-access information upon successful authentication, and sends the generated network side authentication information to the authentication server.

Step 140: after receiving authentication response information, the authentication server authenticates the user terminal according to information in the authentication response, and generates keying material according to the multi-access information of the user terminal upon successful authentication. The authentication server sends the keying material to the access forwarding functional module or sends the keying material to both the access forwarding functional module and the access managing functional module, or sends the keying material to the access forwarding functional module via the access managing functional module. When each service is achieved between the user terminal and the network side, the multi-access information is protected through the keying material.

In this embodiment, the user terminal and the authentication server generate the keying material with the same key generation algorithm, i.e., the same key generation algorithm is preconfigured in both the user terminal and the authentication server, the user terminal and the authentication server generate corresponding keys based on the same element and the same key generation algorithm. The key generation algorithms include Data Encryption Standard (DES), asymmetric encryption source code (RSA), and the like.

In this embodiment, the user terminal and the authentication server side generate the keying material according to the multi-access information of the user terminal, the keying material is suitable for each access interface corresponding to each access service of the user terminal, namely, all the access interfaces will use the keying material to encrypt and decrypt the service information.

Figure 2:
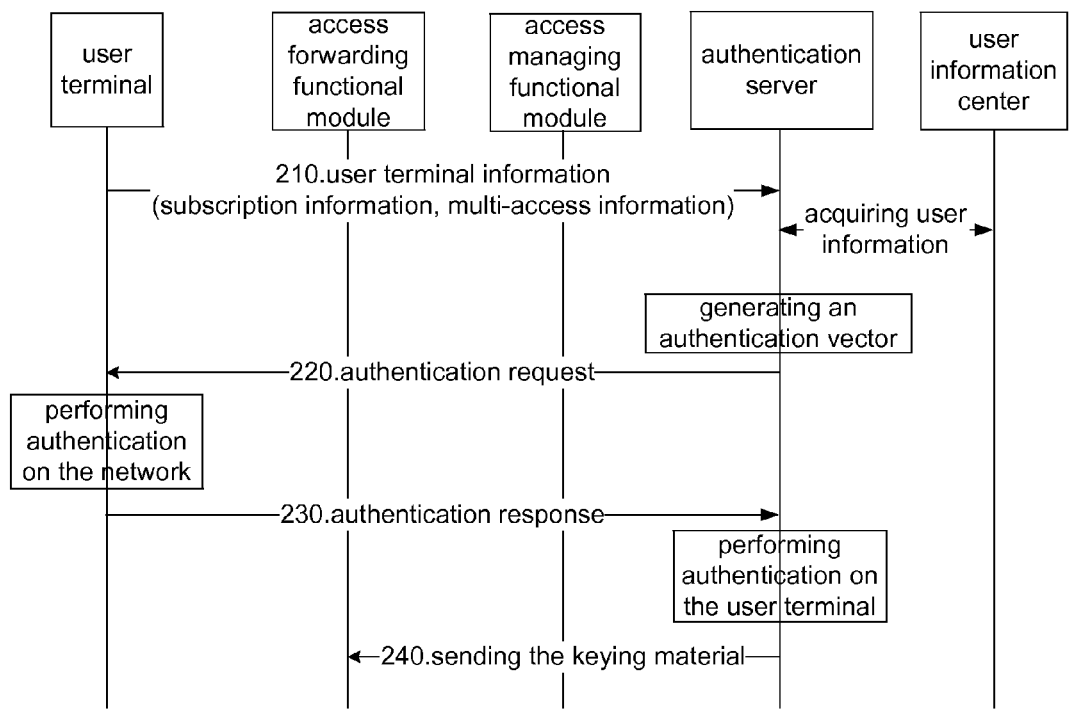
FIG. 2 is a flowchart of Embodiment 2 of a method for multi-access authentication in NGN according to the present disclosure.

FIG. 2 is a flowchart of Embodiment 2 of the method for multi-access authentication in NGN according to the present disclosure. As shown in FIG. 2, the method for multi-access authentication in NGN in this embodiment includes the following steps.

Step 210: when accessing the network, the user terminal sends via the access node to the authentication server a relevant message of the user terminal itself, wherein the message sent by the user terminal to the authentication server at least includes subscription information of the user terminal and multi-access information of the multi-access service supported by the user terminal, wherein the multi-access information includes the identifier of the multi-access service, information of multiple interfaces of the user terminal, and the like. The authentication server generates a corresponding authentication vector after receiving the relevant message sent by the user terminal.

This step is identical to Step 110.

Step 220: the authentication server sends to the user terminal an authentication request including authentication information such as a challenge value. This step is identical to Step 120.

Step 230: after receiving the authentication request, the user terminal performs authentication on the network side according to authentication information in the authentication request, and generates a master key upon successful authentication, and generates keying material for each access interface and network side authentication information according to the multi-access information of the user terminal, and sends the generated network side authentication information to the authentication server.

In this step, the user terminal will generate a master key according to a corresponding key generation algorithm, and generate keying material respectively for multiple access interfaces using the master key, each access interface will perform encryption and decryption using the respective keying material.

Step 240: after receiving authentication response information, the authentication server authenticates the user terminal according to information in the authentication response, generates a master key according to a corresponding key generation algorithm upon successful authentication, and generates keying material for each access interface of the user terminal according to the multi-access information of the user terminal. The authentication server sends the generated keying material to the access forwarding functional module or sends the generated keying material to both the access forwarding functional module and the access managing functional module, or sends the generated keying material to the access forwarding functional module via the access managing functional module. When each service is achieved between the user terminal and the network side, the multi-access information is protected through the keying material.

In this embodiment, the user terminal and the authentication server generate the keying material with the same key generation algorithm, i.e., the same key generation algorithm is preconfigured in both the user terminal and the authentication server, the user terminal and the authentication server both generate the master key first, and then generate the keying material respectively according to respective multi-access information of the user terminal, and the keying material for the access interface of the user terminal side and that for the corresponding access interface of the authentication server side are the same. The key generation algorithms include Data Encryption Standard (DES), asymmetric encryption source code (RSA), and the like.

Figure 3:
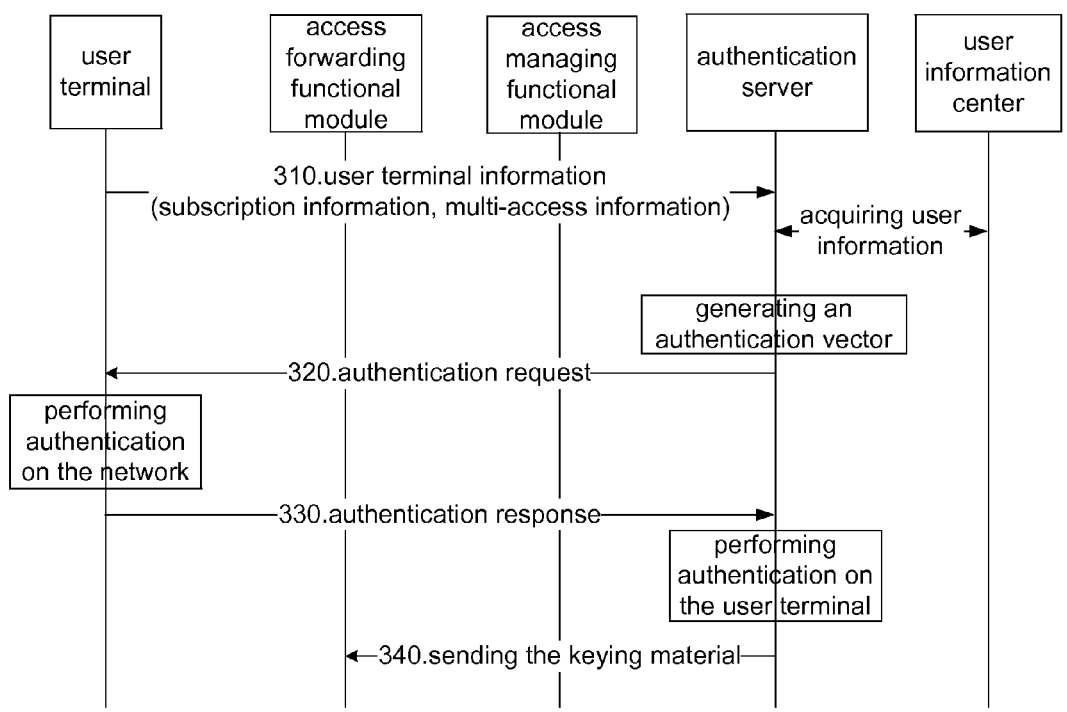
FIG. 3 is a flowchart of Embodiment 3 of a method for multi-access authentication in NGN according to the present disclosure.

FIG. 3 is a flowchart of Embodiment 3 of the method for multi-access authentication in NGN according to the present disclosure. As shown in FIG. 3, the method for multi-access authentication in NGN in this embodiment includes following steps.

Step 310: when accessing the network, the user terminal sends via the access node to the authentication server a relevant message of the user terminal itself, wherein the message sent by the user terminal to the authentication server at least includes subscription information of the user terminal and multi-access information of the multi-access service supported by the user terminal, wherein the multi-access information includes the identifier of the multi-access service, information of multiple interfaces of the user terminal, and the like. The authentication server generates a corresponding authentication vector after receiving the relevant message sent by the user terminal.

This step is identical to Step 110.

Step 320: the authentication server sends to the user terminal an authentication request including authentication information such as a challenge value. This step is identical to Step 120.

Step 330: after receiving the authentication request, the user terminal performs authentication on the network side according to authentication information in the authentication request, generates the keying material for each access interface and network side authentication information according to the multi-access information of the user terminal upon successful authentication, and sends the generated network side authentication information to the authentication server.

In this step, the user terminal will generate keying material respectively according to a corresponding key generation algorithm and respective multi-access information, each access interface will perform encryption and decryption using the respective keying material.

Step 340: after receiving authentication response information, the authentication server authenticates the user terminal according to information in the authentication response, and generates the keying material for each access interface of the user terminal according to a corresponding key generation algorithm and the multi-access information of the user terminal upon successful authentication. The authentication server sends the generated keying material to the access forwarding functional module or sends the generated keying material to both the access forwarding functional module and the access managing functional module, or sends the generated keying material to the access forwarding functional module via the access managing functional module. When each service is achieved between the user terminal and the network side, the multi-access information is protected through the keying material.

In this embodiment, the user terminal and the authentication server generate the keying material with the same key generation algorithm, i.e., the same key generation algorithm is preconfigured in both the user terminal and the authentication server, the user terminal and the authentication server generate corresponding keys based on the same element and the same key generation algorithm. The key generation algorithms include Data Encryption Standard (DES), asymmetric encryption source code (RSA), and the like.

In this embodiment, the user terminal and the authentication server side generate the keying material respectively according to the key generation algorithm and respective multi-access information of the user terminal. When a corresponding access service is carried out between the user terminal and the network side, encryption and decryption is performed using the keying material for each access interface.

Figure 4:
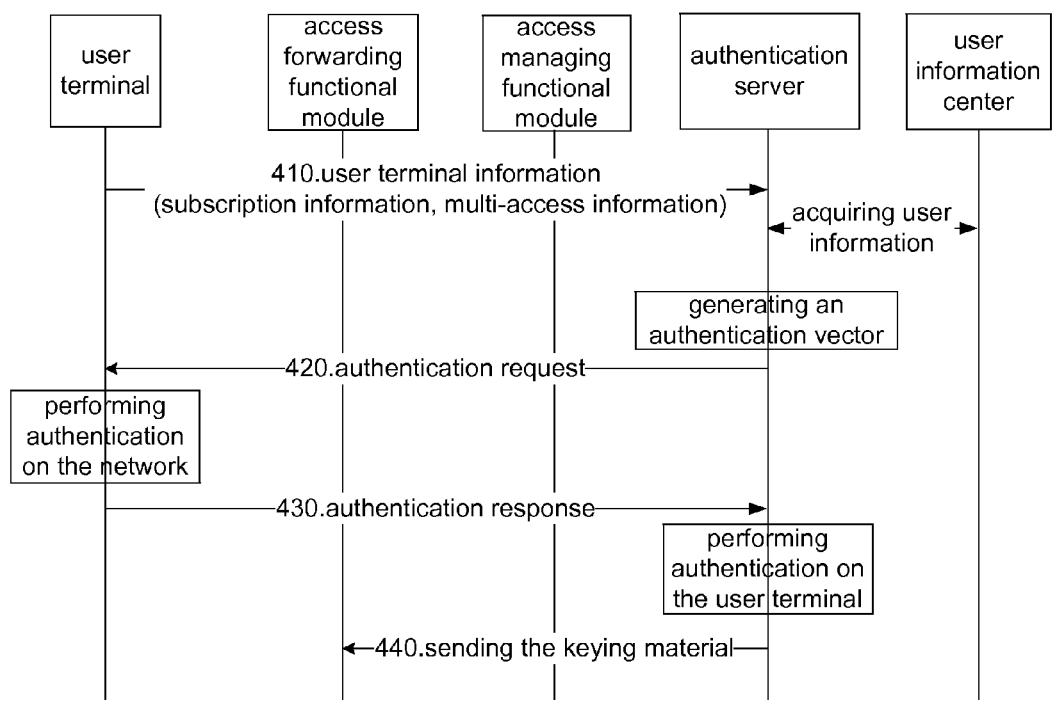
FIG. 4 is a flowchart of Embodiment 4 of a method for multi-access authentication in NGN according to the present disclosure.

FIG. 4 is a flowchart of Embodiment 4 of the method for multi-access authentication in NGN according to the present disclosure. As shown in FIG. 4, the method for multi-access authentication in NGN in this embodiment includes the following steps.

Step 410: when accessing the network, the user terminal sends via the access node to the authentication server a relevant message of the user terminal itself, wherein the message sent by the user terminal to the authentication server at least includes subscription information of the user terminal and multi-access information of the multi-access service supported by the user terminal, wherein the multi-access information includes the identifier of the multi-access service, information of multiple interfaces of the user terminal, and the like. The authentication server generates a corresponding authentication vector after receiving the relevant message sent by the user terminal.

This step is identical to Step 110.

Step 420: the authentication server sends to the user terminal an authentication request including authentication information such as a challenge value. This step is identical to Step 120.

Step 430: after receiving the authentication request, the user terminal performs authentication on the network side according to authentication information in the authentication request, generates a master key upon successful authentication, and generates keying material for each access interface and network side authentication information according to the multi-access information of the user terminal, and sends the generated network side authentication information to the authentication server.

In this step, the user terminal will generate a master key according to a corresponding key generation algorithm, and generate keying material respectively for multiple access interfaces using the master key, each access interface will perform encryption and decryption using the respective keying material.

Step 440: after receiving authentication response information, the authentication server authenticates the user terminal according to information in the authentication response, and generates, upon successful authentication, keying material for each access interface of the user terminal according to a corresponding key generation algorithm and the multi-access information of the user terminal. The authentication server sends the generated keying material to the access forwarding functional module or sends the generated keying material to both the access forwarding functional module and the access managing functional module, or sends the generated keying material to the access forwarding functional module via the access managing functional module. When each service is achieved between the user terminal and the network side, the multi-access information is protected through the keying material. This step differs from Step 240 mainly in that the master key is no longer generated, instead, respective keying material for corresponding interfaces are directly generated according to the key generation algorithm and respective multi-access information.

In this embodiment, the user terminal and the authentication server generate the keying material with the same key generation algorithm, i.e., the same key generation algorithm is preconfigured in both the user terminal and the authentication server, the user terminal side generates the master key first, and then generates keying material respectively according to respective multi-access information of the user terminal, while the authentication server directly generates respective keying material according to the same key generation algorithm and respective multi-access information of the user terminal, in this way, the keying material for an access interface of the user terminal side and that for a corresponding access interface of the authentication server side are the same. The key generation algorithms include Data Encryption Standard (DES), asymmetric encryption source code (RSA), and the like.

Figure 5:
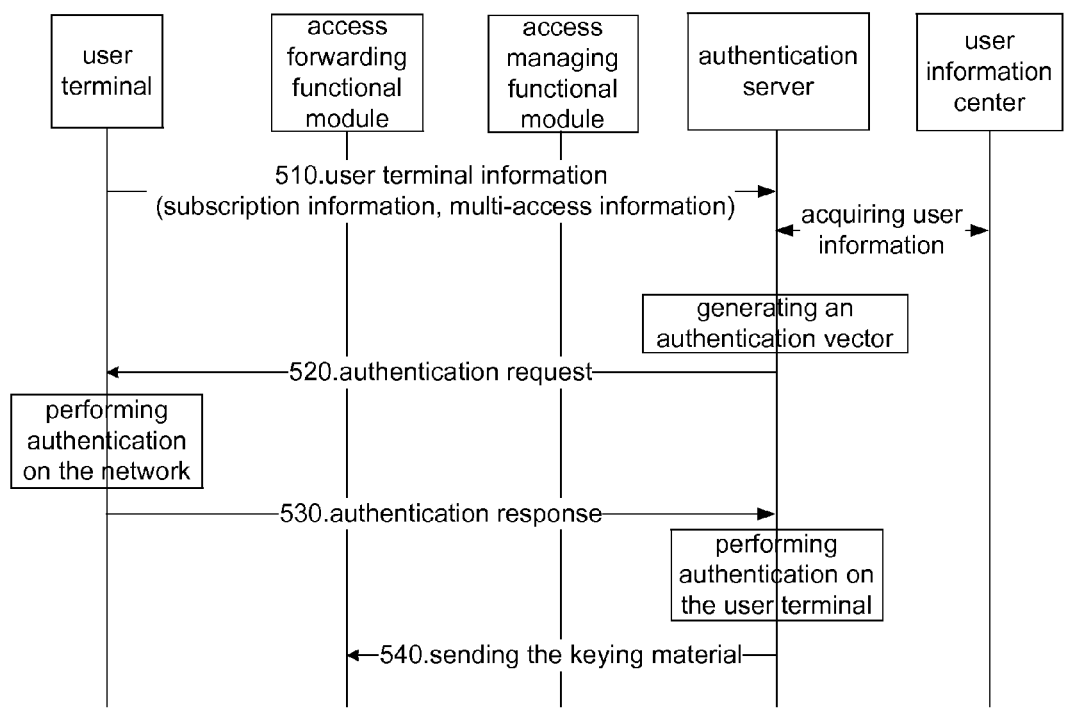
FIG. 5 is a flowchart of Embodiment 5 of a method for multi-access authentication in NGN according to the present disclosure.

FIG. 5 is a flowchart of Embodiment 5 of the method for multi-access authentication in NGN according to the present disclosure. As shown in FIG. 5, the method for multi-access authentication in NGN in this embodiment includes the following steps.

Step 510: when accessing the network, the user terminal sends via the access node to the authentication server a relevant message of the user terminal itself, wherein the message sent by the user terminal to the authentication server at least includes subscription information of the user terminal and multi-access information of the multi-access service supported by the user terminal, wherein the multi-access information includes the identifier of the multi-access service, information of multiple interfaces of the user terminal, and the like. The authentication server generates a corresponding authentication vector after receiving the relevant message sent by the user terminal.

This step is identical to Step 110.

Step 520: the authentication server sends to the user terminal an authentication request including authentication information such as a challenge value.

This step is identical to Step 120.

Step 530: after receiving the authentication request, the user terminal performs authentication on the network side according to authentication information in the authentication request, generates, upon successful authentication, the keying material for each access interface and network side authentication information according to the multi-access information of the user terminal, and sends the generated network side authentication information to the authentication server.

In this step, the user terminal will generate keying material respectively according to a corresponding key generation algorithm and respective multi-access information, each access interface will perform encryption and decryption using the respective keying material.

Step 540: after receiving authentication response information, the authentication server authenticates the user terminal according to information in the authentication response, generates a master key according to a corresponding key generation algorithm upon successful authentication, and generates keying material for each access interface of the user terminal according to the multi-access information of the user terminal. The authentication server sends the generated keying material to the access forwarding functional module or sends the generated keying material to both the access forwarding functional module and the access managing functional module, or sends the generated keying material to the access forwarding functional module via the access managing functional module. When each service is achieved between the user terminal and the network side, the multi-access information is protected through the keying material.

In this embodiment, the user terminal and the authentication server generate the keying material with the same key generation algorithm, i.e., the same key generation algorithm is preconfigured in both the user terminal and the authentication server, the user terminal side directly generates respective keying material according to a key generation algorithm configured in the user terminal and respective multi-access information of the user terminal, while the authentication server generates a master key first, and then generates keying material respectively according to respective multi-access information of the user terminal, and the keying material for the access interface of the user terminal side and that for the corresponding access interface of the authentication sever side are the same. The key generation algorithms include Data Encryption Standard (DES), asymmetric encryption source code (RSA), and the like.

Figure 6:
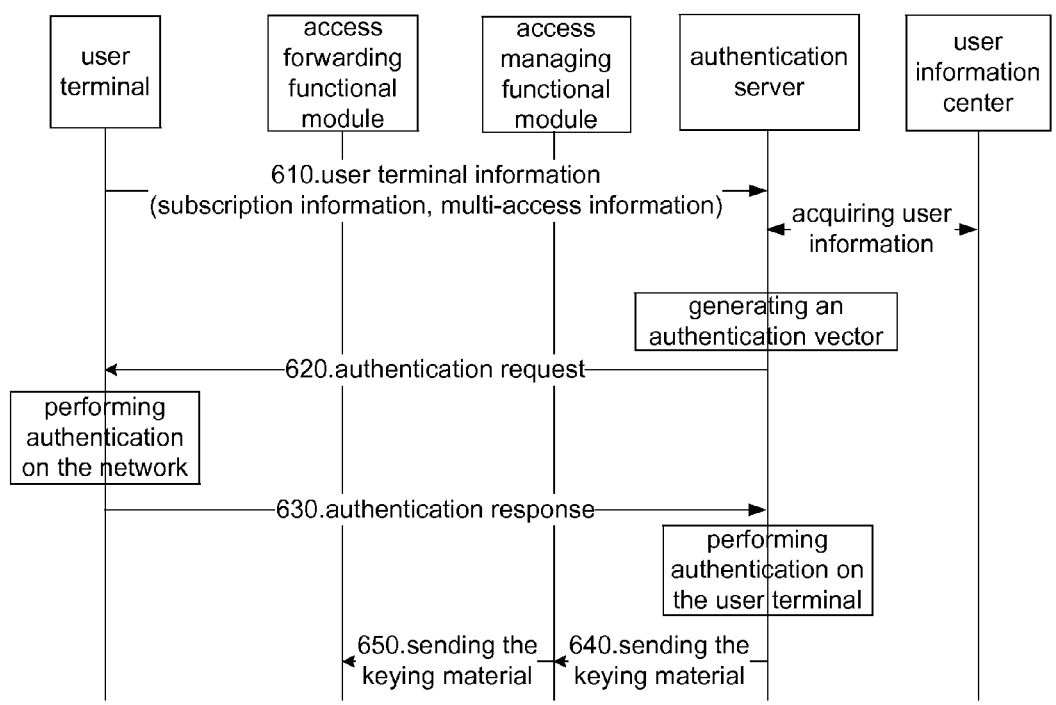
FIG. 6 is a flowchart of Embodiment 6 of a method for multi-access authentication in NGN according to the present disclosure.

FIG. 6 is a flowchart Embodiment 6 of the method for multi-access authentication in NGN according to the present disclosure. As shown in FIG. 6, the method for multi-access authentication in NGN in this embodiment includes the following steps.

Step 610: when accessing the network, the user terminal sends via the access node to the authentication server a relevant message of the user terminal itself, wherein the message sent by the user terminal to the authentication server at least includes subscription information of the user terminal and multi-access information of the multi-access service supported by the user terminal, wherein the multi-access information includes the identifier of the multi-access service, information of multiple interfaces of the user terminal, and the like. The authentication server generates a corresponding authentication vector after receiving the relevant message sent by the user terminal.

This step is identical to Step 110.

Step 620: the authentication server sends to the user terminal an authentication request including authentication information such as a challenge value.

This step is identical to Step 120.

Step 630: after receiving the authentication request, the user terminal performs authentication on the network side according to authentication information in the authentication request, generates, upon successful authentication, keying material for each access interface and network side authentication information according to the multi-access information of the user terminal, and sends the generated network side authentication information to the authentication server.

In this step, the user terminal will generate keying material respectively according to a corresponding key generation algorithm and respective multi-access information, each access interface will perform encryption and decryption using the respective keying material.

Step 640: after receiving authentication response information, the authentication server authenticates the user terminal according to information in the authentication response, generates a master key according to a corresponding key generation algorithm upon successful authentication and sends the master key to the access managing functional module.

Step 650: the access managing functional module generates keying material for each access interface according to the master key and the multi-access information of the user terminal, and sends the generated keying material to the access forwarding functional module, wherein the access managing functional module acquires the multi-access information of the user terminal from the user terminal or the network side authentication center.

In this embodiment, the key generation algorithms configured in the user terminal, the access managing functional module, and the authentication server are the same, i.e., the same key generation algorithm is preconfigured in the user terminal, the access managing functional module, and the authentication server. The user terminal side directly generates respective keying material according to a key generation algorithm configured in the user terminal and respective multi-access information of the user terminal, while the authentication server generates only a master key. The access managing functional module generates keying material respectively according to the master key and respective multi-access information of the user terminal, and the keying material for the access interface of the user terminal side and that for the corresponding access interface of the authentication server side are the same. The key generation algorithms include Data Encryption Standard (DES), asymmetric encryption source code (RSA), and the like.

Figure 7:
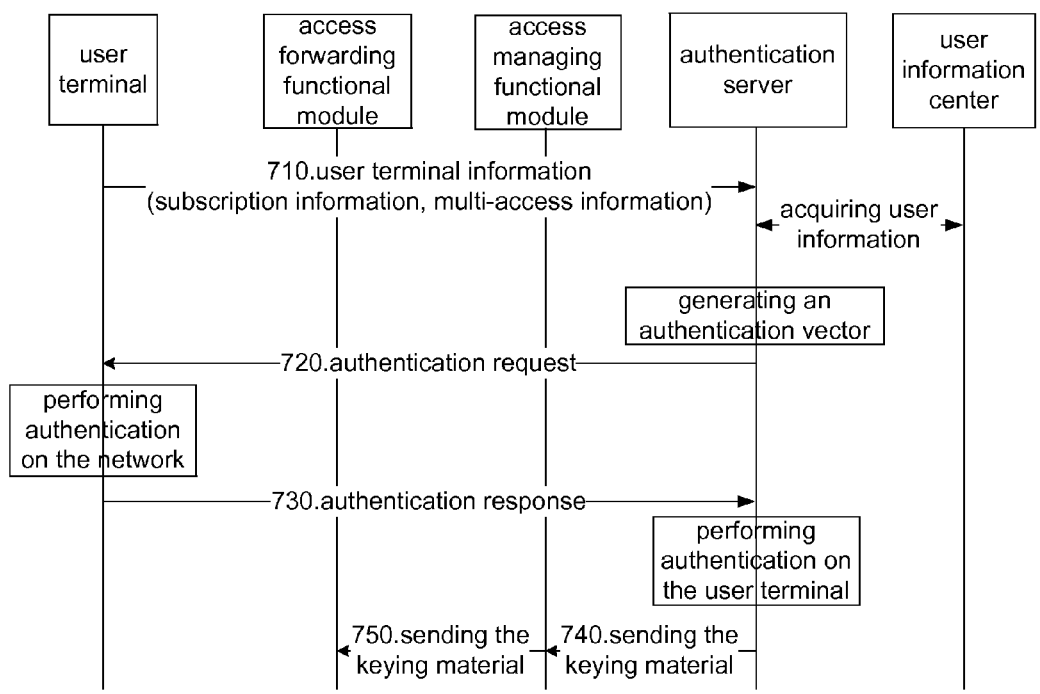
FIG. 7 is a flowchart of Embodiment 7 of a method for multi-access authentication in NGN according to the present disclosure.

FIG. 7 is a flowchart of Embodiment 7 of the method for multi-access authentication in NGN according to the present disclosure. As shown in FIG. 7, the method for multi-access authentication in NGN in this embodiment includes the following steps.

Step 710: when accessing the network, the user terminal sends via the access node to the authentication server a relevant message of the user terminal itself, wherein the message sent by the user terminal to the authentication server at least includes subscription information of the user terminal and multi-access information of the multi-access service supported by the user terminal, wherein the multi-access information includes the identifier of the multi-access service, information of multiple interfaces of the user terminal, and the like. The authentication server generates a corresponding authentication vector after receiving the relevant message sent by the user terminal.

This step is identical to Step 110.

Step 720: the authentication server sends to the user terminal an authentication request including authentication information such as a challenge value.

This step is identical to Step 120.

Step 730: after receiving the authentication request, the user terminal performs authentication on the network side according to authentication information in the authentication request, generates a master key upon successful authentication, and generates keying material for each access interface and network side authentication information according to the multi-access information of the user terminal, and sends the generated network side authentication information to the authentication server.

In this step, the user terminal will generate a master key according to a corresponding key generation algorithm, and generates keying material respectively for multiple access interfaces using the master key, each access interface will perform encryption and decryption using the respective keying material.

Step 740: after receiving authentication response information, the authentication server authenticates the user terminal according to information in the authentication response, generates a master key according to a corresponding key generation algorithm upon successful authentication and sends the master key to the access managing functional module.

Step 750: the access managing functional module generates keying material for each access interface according to the master key and the multi-access information of the user terminal, and sends the generated keying material to the access forwarding functional module, wherein the access managing functional module acquires the multi-access information of the user terminal from the user terminal or the network side authentication center.

In this embodiment, the key generation algorithms configured in the user terminal, the access managing functional module, and the authentication server are the same, i.e., the same key generation algorithm is preconfigured in the user terminal, the access managing functional module, and the authentication server. The user terminal side first generates a master key, and then directly generates respective keying material according to a key generation algorithm configured in the user terminal and respective multi-access information of the user terminal, while the authentication server generates only a master key. The access managing functional module generates keying material respectively according to the master key and respective multi-access information of the user terminal, and the keying material for the access interface of the user terminal side and that for the corresponding access interface of the authentication server side are the same. The key generation algorithms include Data Encryption Standard (DES), asymmetric encryption source code (RSA), and the like.

Figure 8:
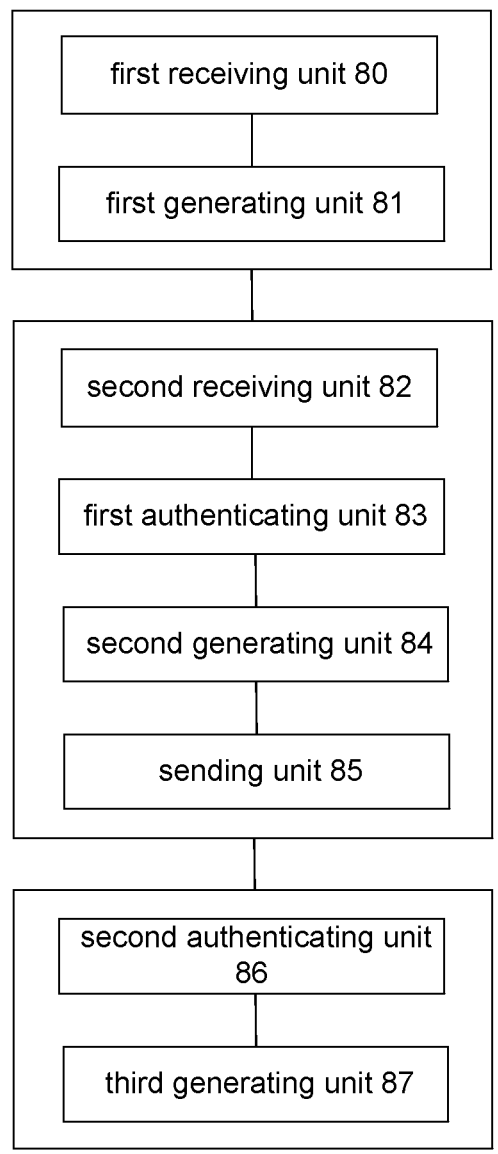
FIG. 8 is a diagram illustrating the structure of a system for multi-access authentication in NGN according to the present disclosure.

The system for multi-access authentication in NGN according to the present disclosure includes a network side and a user terminal, wherein the network side is provided with a network side authentication center and an access node, and the access node includes an access forwarding functional module and an access managing functional module. The access node may for example be a network element for access of a user terminal, such as a base station and an access gateway. The network side authentication center may for example be a network element such as an authentication server. FIG. 8 is a diagram illustrating the structure of the system for multi-access authentication in NGN according to the present disclosure. As shown in FIG. 8, the system for multi-access authentication in NGN according to the present disclosure further includes: a first receiving unit 80, a first generating unit 81, a second receiving unit 82, a first authenticating unit 83, a second generating unit 84, a sending unit 85, a second authenticating unit 86, and a third generating unit 87, wherein the second receiving unit 82, the first authenticating unit 83, the second generating unit 84, and the sending unit 85 are arranged in the user terminal, and the rest of the units are arranged at the network side authentication center; wherein the first receiving unit 80 is configured to receive user terminal information sent by the user terminal; wherein the user terminal information includes subscription information and multi-access information of the user terminal;

the first generating unit 81 is configured to generate an authentication vector after the first receiving unit 80 receives the user terminal information;

the second receiving unit 82 is configured to receive an authentication request sent by the network side authentication center;

the first authenticating unit 83 is configured to perform authentication on the network side;

the second generating unit 84 is configured to generate keying material and network side authentication information according to the multi-access information of the user terminal upon successful authentication by the first authenticating unit 83;

the sending unit 85 is configured to send the network side authentication information to the network side authentication center; wherein the authentication request includes authentication information;

the second authenticating unit 86 is configured to perform authentication on the network side authentication information using the authentication vector; and the third generating unit 87 is configured to generate keying material according to the multi-access information of the user terminal upon successful authentication by the second authenticating unit 86;

the access forwarding functional module is configured to encrypt and decrypt the access service information of the user terminal according to the keying material.

The access forwarding functional module is further configured to acquire the keying material from the network side authentication center or the access managing functional module, and encrypt and decrypt the access service information of the user terminal using the keying material.

The second generating unit 84 is further configured to generates keying material according to the multi-access information of the user terminal;

correspondingly, the third generating unit 87 is further configured to directly generate keying material for the multi-access information of the user terminal; acquiring, by the access forwarding functional module, the keying material from the network side authentication center includes: the third generating unit 87 sends the generated keying material directly to the access forwarding functional module, or sends the generated keying material to the access forwarding functional module via the access managing functional module.

Or, the second generating unit 84 is further configured to generate keying material for each access interface according to the multi-access information of the user terminal;

correspondingly, the third generating unit 87 is further configured to generate keying material for each access interface according to the multi-access information of the user terminal; and acquiring, by the access forwarding functional module, the keying material from the network side authentication center includes: the third generating unit 87 sends the generated keying material directly to the access forwarding functional module, or sends the generated keying material to the access forwarding functional module via the access managing functional module.

Or, the second generating unit 84 is further configured to generate a master key, and generate keying material for each access interface according to the multi-access information of the user terminal;

Correspondingly, the third generating unit 87 is further configured to generate a master key, and generate keying material for each access interface according to the multi-access information of the user terminal; and acquiring, by the access forwarding functional module, the keying material from the network side authentication center includes: the third generating unit 87 sends the generated keying material directly to the access forwarding functional module, or sends the generated keying material to the access forwarding functional module via the access managing functional module.

Or, the second generating unit 84 is further configured to generate a master key, and generate keying material for each access interface according to the multi-access information of the user terminal;

correspondingly, the third generating unit 87 is further configured to generate keying material for each access interface according to the multi-access information of the user terminal; and acquiring, by the access forwarding functional module, the keying material from the network side authentication center includes: the third generating unit 87 sends the generated keying material directly to the access forwarding functional module, or sends the generated keying material to the access forwarding functional module via the access managing functional module.

Or, the second generating unit 84 is further configured to generate keying material for each access interface according to the multi-access information of the user terminal;

corresponding, the third generating unit 87 is further configured to generate a master key, and generate keying material for each access interface according to the multi-access information of the user terminal; and acquiring, by the access forwarding functional module, the keying material from the network side authentication center includes: the third generating unit 87 sends the generated keying material directly to the access forwarding functional module, or sends the generated keying material to the access forwarding functional module via the access managing functional module.

Or, the second generating unit 84 is further configured to generate keying material for each access interface according to the multi-access information of the user terminal;

corresponding, the third generating unit 87 is further configured to generate a master key, and send the master key to the access managing functional module; the access managing functional module is configured to generate keying material for each access interface according to the master key and the multi-access information of the user terminal, wherein the access managing functional module acquires the multi-access information of the user terminal from the user terminal or the network side authentication center; and acquiring, by the access forwarding functional module, the keying material from the access managing functional module includes: the access managing functional module sends the generated keying material to the access forwarding functional module.

Or, the second generating unit 84 is further configured to generate a master key, and generate keying material for each access interface according to the multi-access information of the user terminal;

corresponding, the third generating unit 87 is further configured to generate a master key, and send the master key to the access managing functional module; the access managing functional module is configured to generate keying material for each access interface according to the master key and the multi-access information of the user terminal, wherein the access managing functional module acquires the multi-access information of the user terminal from the user terminal or the network side authentication center; and acquiring, by the access forwarding functional module, the keying material from the access managing functional module includes: the access managing functional module sends the generated keying material to the access forwarding functional module.

Those skilled in the art will understand that the system for multi-access authentication in NGN shown in FIG. 8 is configured for implementation of the method for multi-access authentication in NGN, the implementation function of each processing unit in the figure may be understood with reference to corresponding description of the method. The function of each processing unit in the system shown in FIG. 8 may be realized by running a program in a processor, or by a specific logic circuit.

What described above is only preferred embodiments of the disclosure, and is not intended to limit the protection scope of the disclosure.

What is claimed is:

1. A method for multi-access authentication in Next Generation Network (NGN), a network side authentication center and an access node being provided at a network side, and the access node comprising an access forwarding functional module and an access managing functional module; the method comprising:

generating, by the network side authentication center, an authentication vector after receiving user terminal information from a user terminal; wherein the user terminal information comprises subscription information and multi-access information of the user terminal;

performing, by the user terminal, authentication on the network side after receiving an authentication request from the network side authentication center, and generating keying material and network side authentication information according to the multi-access information of the user terminal itself upon successful authentication, and sending the network side authentication information to the network side authentication center; wherein the authentication request comprises authentication information;

performing, by the network side authentication center, authentication on the network side authentication information using the authentication vector;

generating keying material according to the multi-access information of the user terminal upon successful authentication; and acquiring, by the access forwarding functional module, the keying material from the network side authentication center or the access managing functional module, and encrypting and decrypting access service information of the user terminal using the keying material, wherein generating keying material according to the multi-access information of the user terminal itself comprises:

generating, by the user terminal, keying material for each access interface according to the multi-access information of the user terminal itself;

generating keying material according to the multi-access information of the user terminal upon successful authentication comprises:

generating, by the network side authentication center, keying material for each access interface according to the multi-access information of the user terminal; and acquiring, by the access forwarding functional module, the keying material from the network side authentication center comprises:

sending, by the network side authentication center, the keying material directly to the access forwarding functional module, or sending the keying material to the access forwarding functional module via the access managing functional module.

2. The method according to claim 1, wherein generating keying material according to the multi-access information of the user terminal itself further comprises:

generating, by the user terminal, a master key;

generating keying material according to the multi-access information of the user terminal upon successful authentication further comprises:

generating, by the network side authentication center, a master key.

3. The method according to claim 1, wherein generating keying material according to the multi-access information of the user terminal itself further comprises:

generating, by the user terminal, a master key.

4. The method according to claim 1, wherein generating keying material according to the multi-access information of the user terminal upon successful authentication further comprises:

generating, by the network side authentication center, a master key.

5. A method for multi-access authentication in Next Generation Network (NGN), a network side authentication center and an access node being provided at a network side, and the access node comprising an access forwarding functional module and an access managing functional module; the method comprising:

generating, by the network side authentication center, an authentication vector after receiving user terminal information from a user terminal; wherein the user terminal information comprises subscription information and multi-access information of the user terminal;

performing, by the user terminal, authentication on the network side after receiving an authentication request from the network side authentication center, and generating keying material and network side authentication information according to the multi-access information of the user terminal itself upon successful authentication, and sending the network side authentication information to the network side authentication center; wherein the authentication request comprises authentication information;

performing, by the network side authentication center, authentication on the network side authentication information using the authentication vector;

generating keying material according to the multi-access information of the user terminal upon successful authentication; and acquiring, by the access forwarding functional module, the keying material from the network side authentication center or the access managing functional module, and encrypting and decrypting access service information of the user terminal using the keying material, wherein generating keying material according to the multi-access information of the user terminal itself comprises:

generating, by the user terminal, keying material for each access interface according to the multi-access information of the user terminal itself;

generating keying material according to the multi-access information of the user terminal upon successful authentication comprises:

generating, by the network side authentication center, a master key, and informing the access managing functional module of the master key; generating, by the access managing functional module, keying material for each access interface according to the master key and the multi-access information of the user terminal, wherein the access managing functional module acquires the multi-access information of the user terminal from the user terminal or the network side authentication center; and acquiring, by the access forwarding functional module, the keying material from the access managing functional module comprises:

sending, by the access managing functional module, the generated keying material to the access forwarding functional module.

6. A method for multi-access authentication in Next Generation Network (NGN), a network side authentication center and an access node being provided at a network side, and the access node comprising an access forwarding functional module and an access managing functional module; the method comprising:

generating, by the network side authentication center, an authentication vector after receiving user terminal information from a user terminal; wherein the user terminal information comprises subscription information and multi-access information of the user terminal;

performing, by the user terminal, authentication on the network side after receiving an authentication request from the network side authentication center, and generating keying material and network side authentication information according to the multi-access information of the user terminal itself upon successful authentication, and sending the network side authentication information to the network side authentication center; wherein the authentication request comprises authentication information;

performing, by the network side authentication center, authentication on the network side authentication information using the authentication vector; and generating keying material according to the multi-access information of the user terminal upon successful authentication, wherein generating keying material according to the multi-access information of the user terminal itself comprises:

generating, by the user terminal, a master key, and generating keying material for each access interface according to the multi-access information of the user terminal itself;

acquiring, by the access forwarding functional module, the keying material from the network side authentication center comprises:

generating, by the network side authentication center, a master key, and informing the access managing functional module of the master key; generating, by the access managing functional module, keying material for each access interface according to the master key and the multi-access information of the user terminal, wherein the access managing functional module acquires the multi-access information of the user terminal from the user terminal or the network side authentication center; and acquiring, by the access forwarding functional module, the keying material from the access managing functional module comprises:

sending, by the access managing functional module, the generated keying material to the access forwarding functional module.

* * * * *